United States Patent [19]
Yamase et al.

[11] Patent Number: 5,149,600
[45] Date of Patent: Sep. 22, 1992

[54] FUEL CELL ELECTRICITY GENERATION PROCESS

[75] Inventors: Osamu Yamase; Sumio Yoshizawa; Tadayuki Miura, all of Tokyo, Japan

[73] Assignee: Petroleum Energy Center and Showa Shell Sekiyu Kabushiki Kaisha, Tokyo, Japan

[21] Appl. No.: 634,590

[22] Filed: Dec. 27, 1990

[30] Foreign Application Priority Data

Dec. 27, 1989 [JP] Japan .................. 1-336486

[51] Int. Cl.$^5$ .............................. H01M 8/06
[52] U.S. Cl. ........................ 429/17; 429/19; 429/20
[58] Field of Search ............. 429/17, 19, 20, 24, 429/25

[56] References Cited

U.S. PATENT DOCUMENTS

| | | | |
|---|---|---|---|
| 4,738,903 | 4/1988 | Garow et al. | 429/17 |
| 4,921,765 | 5/1990 | Gmeindl et al. | 429/16 |
| 4,994,331 | 2/1991 | Cohen | 429/17 |

Primary Examiner—William R. Dixon, Jr.
Assistant Examiner—Chris Gallo
Attorney, Agent, or Firm—Cushman, Darby & Cushman

[57] ABSTRACT

The present invention provides an improved fuel cell electricity generation process which includes a desulfurizer, an adsorber, a reformer, a shift converter, and a fuel cell wherein reformed gas from the reformer is treated using a non-porous gas separation membrane comprising a polymer in place of the converter at a temperature of 50°–150° C. and a pressure of 2–10 kg/cm$^2$ to separate carbon monoxide contained in the reformed gas.

8 Claims, 4 Drawing Sheets

MEMBRANE SEPARATION PERFORMANCE TEST (INFLUENCE OF PRESSURE)

MEMBRANE SEPARATION PERFORMANCE TEST (INFLUENCE OF PRESSURE)

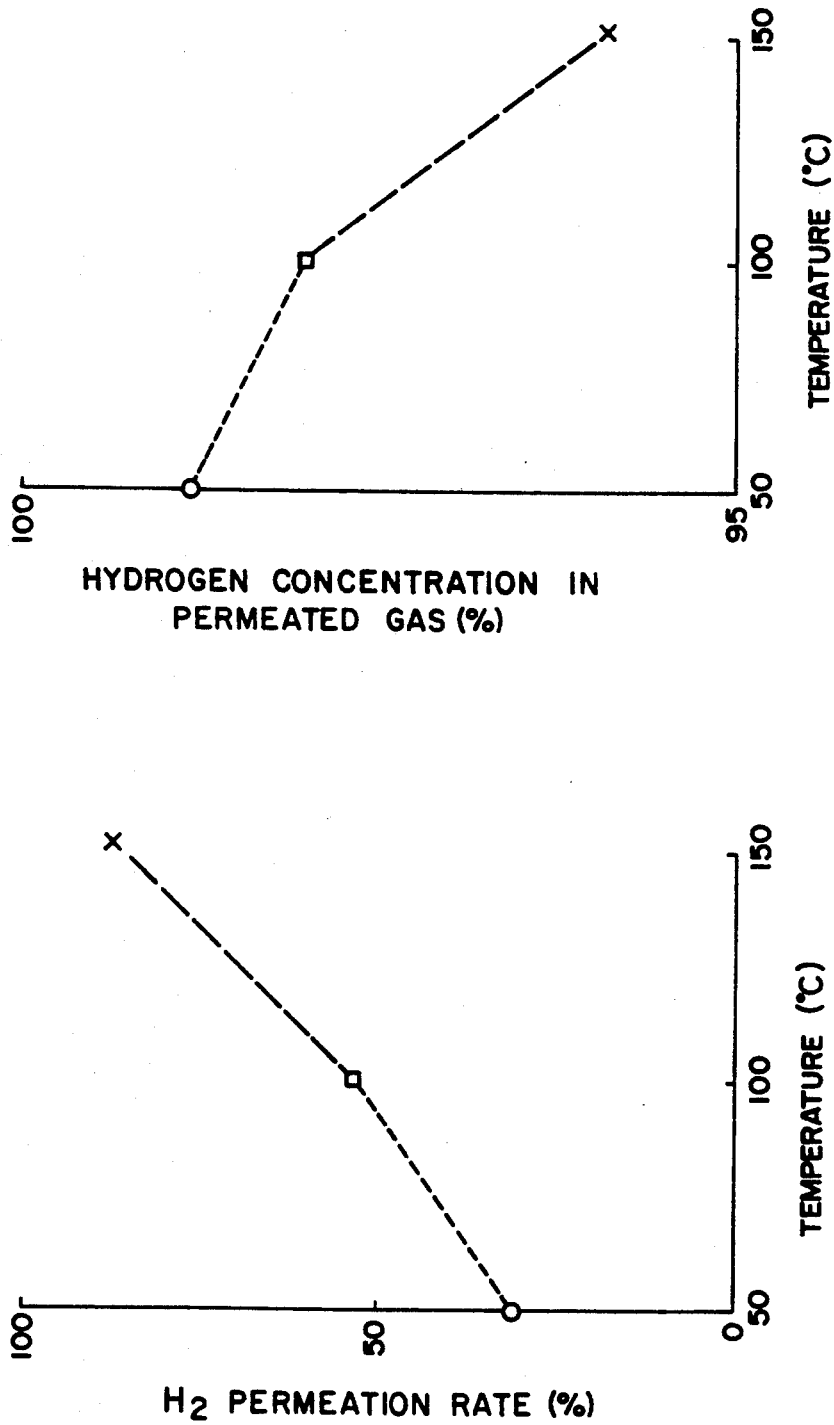

FUEL CELL ELECTRICITY GENERATION PROCESS

The present invention relates to a method of improvement of fuel cell electricity generation process and to a method for separating carbon monoxide from reformed gas to be fed to fuel electrode of fuel cell.

Fuel cell electricity generation process is one of future type energy conversion techniques which have many characteristics such as saving of energy and less environmental pollution.

Fuel cell electricity generation process is roughly shown in FIG. 1. At present, conversion gas reaction ($CO+H_2O=CO_2+H_2$) is used as process for converting reformed gas from reformer to fuel for fuel cell. Reformed gas is a mixed gas mainly composed of hydrogen and comprising $H_2$, CO and $CO_2$. As electrode of cell, noble metal catalyst such as platinum catalyst is used and thus it is poisoned with CO contained in the reformed gas, resulting in reduction of activity. Therefore, it is necessary to reduce concentration of CO to less than tolerance value in cell body (usually CO 1 vol %).

In the converter, high-temperature shift reaction and low-temperature shift reaction are carried out depending on catalysts used. High-temperature shift reaction is carried out at a temperature of 330° C. or higher and a pressure of 1–35 atm and low-temperature shift reaction is carried out at a temperature of 190°–370° C. and a pressure of 1–30 atm. In order to reduce concentration of CO in the converted gas to 1 vol % or less, the two reactions of high-temperature shift reaction and low-temperature shift reaction are necessary and so construction and control of units are complicated and this is a defect in the process for fuel cell which requires change of conditions and due to abrupt change of load.

As shown in the flow sheet of FIG. 2, according to the present invention, the defects brought about due to use of converter have been removed by using membrane separation process in place of converter as process for reduction of CO in reformed gas. Hydrogen gas which has permeated through the separation membrane is fed to fuel electrode of fuel cell and gas which has not permeated through separation membrane is utilized as heat source of reformer-furnace and the like. Further, a part of the gas which has permeated through separation membrane is suited to use for desulfurizing reaction in desulfurizer because of high hydrogen partial pressure.

The present invention relates to a electricity generation process by fuel cell including a desulfulizer, an adsorber, a reformer, a shift converter, and a fuel cell, characterized in that a non-porous polymer membrane, preferably a $H_2$-gas separation membrane is used in place of the converter and reformed gas is treated under the conditions of a temperature of 50°–150° C. and a pressure of 2–10 kg/cm² to separate carbon monoxide contained in the reformed gas.

FIGS. 4A and 4B are graphs which show relation between membrane separation performance and temperature.

Figure 1:
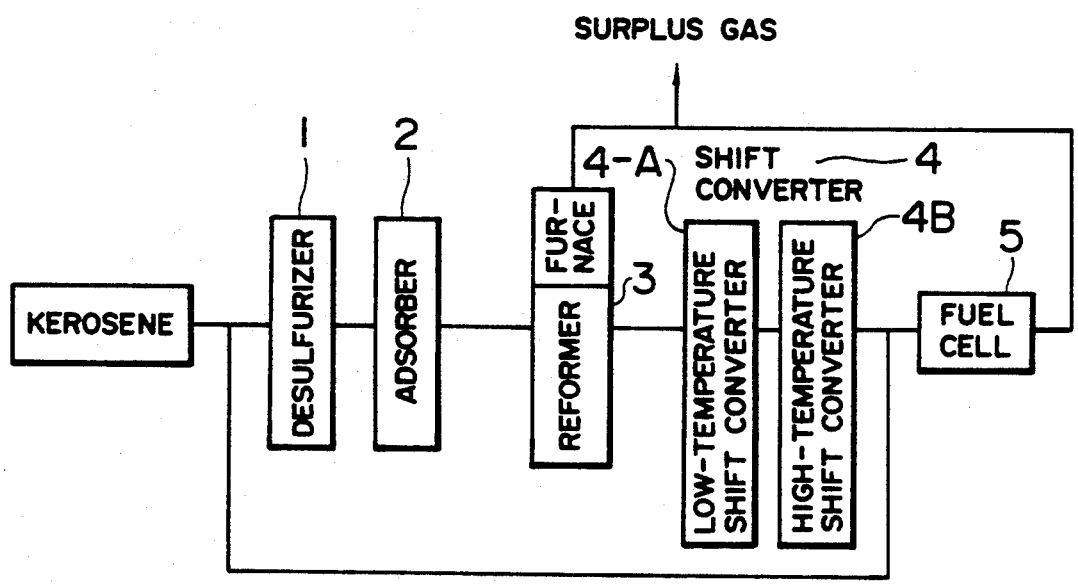
FIG. 1 is a rough flow sheet of conventional fuel cell electricity generation process.
Figure 2:
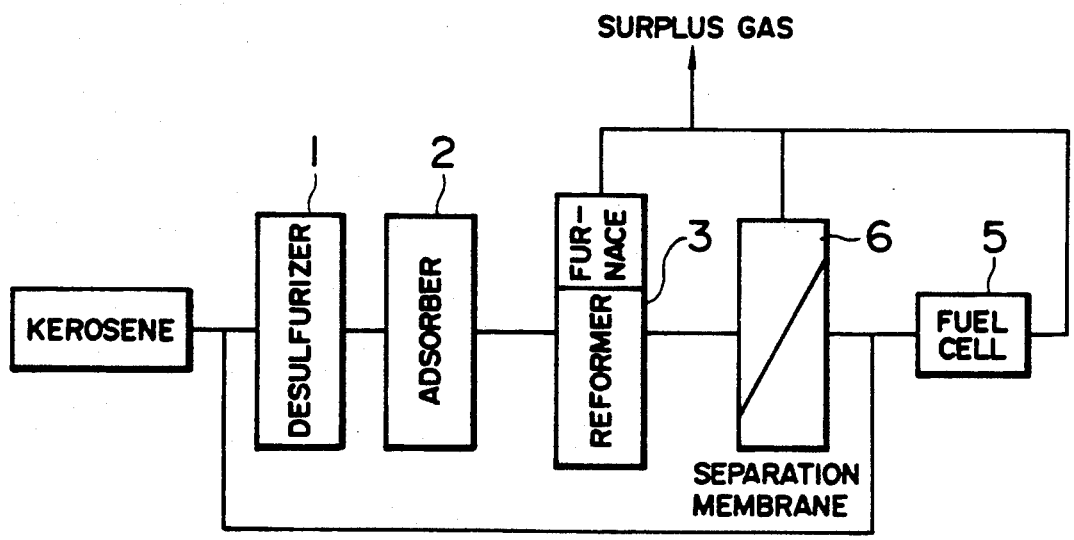
FIG. 2 is a rough flow sheet of the fuel cell electricity generation process of the present invention.

Flow sheet of fuel cell electricity generation process to which the present invention is applied is shown in FIG. 2.

In FIG. 2, 1 indicates a desulfurizer, 2 indicates an adsorber, 3 indicates a reformer provided with a furnace, 6 indicates a separation membrane, and 5 indicates a fuel cell.

As fuels for fuel cell, methanol, natural gas, kerosene, naphtha, LPG, and the like are used.

In the desulfurizer, kerosene (sulfur content 25 ppm) is subjected to desulfurization using a desulfurization catalyst (commercially available one) at a reaction temperature of 400° C. or lower and a pressure of 10 kg/cm² or lower to reduce sulfur content to 1 ppm or lower. In the adsorber, sulfur is removed as hydrogen sulfide at a pressure of 10 kg/cm² or lower and a temperature of 400° C. or lower.

In the reformer, hydrocarbons in raw material are converted to product gas mainly composed of hydrogen which comprises hydrogen, CO and $CO_2$ accordingly to the following reaction formula.

$$C_3H_8+4H_2O=2CO+CO_2+8H_2O$$

Catalyst used is a commercially available nickel catalyst supported on alumina.

Ranges of composition of raw material applicable to the reformer are specific gravity: 0.4–0.85 and components: $C_1$–$C_{20}$ hydrocarbons.

In the reformer, temperature is 700°–850° C., pressure is 10 kg/cm² or lower, $H_2O/C$ (molar ratio) is 2 or more, and SV is 0.5–4.0 hr$^{-1}$.

Ranges of composition of product-gas in the reformer are 65–80 vol % of $H_2$, 5–20 vol % of CO, and 5–25 vol % of $CO_2$, and these vary depending on operation-conditions.

The upper and lower limits of the above ranges determine by changing operation-conditions of reformer, and operation at which composition of $H_2$ is close to the upper limit is preferred.

One example of composition of product-gas in reformer when kerosene, naphtha and LPG were used as raw material is shown in Table 1.

TABLE 1

| Gas | Raw material kerosene (vol %) | Raw material naphtha (vol %) | Raw material LPG (vol %) |
|---|---|---|---|
| $H_2$ | 72.0 | 73.9 | 74.2 |
| CO | 10.8 | 10.0 | 9.7 |
| $CO_2$ | 17.2 | 16.1 | 16.1 |

EXAMPLE

A polyimide type hydrogen separation membrane was used as gas separation membrane for separating carbon monoxide contained in reformed gas, and a mixed gas composed of 69 vol % of $H_2$, 20 vol % of CO, 10 vol % of $CO_2$ and 1 vol % of $CH_4$ was used as raw material composition.

Experiments were conducted under separation conditions of separation membrane non-permeation pressure of 4 kg/cm², 6 kg/cm² or 8 kg/cm², a separation membrane permeation pressure of 10–20 mmAq, and a separation membrane temperature of 50° C., 100° C. or 150° C.

Experimental results on separation performance of membrane are shown in Table 2 and change of separation performance of membrane with time is shown in Table 3.

TABLE 2

| Membrane temperature °C. | Non-permeation pressure kg/cm² | Composition of inlet gas (mol %) | | | Composition of permeated gas (mol %) | | | Permeation rate of $H_2$ (mol %) |
|---|---|---|---|---|---|---|---|---|
| | | $H_2$ | CO | $CO_2$ | $H_2$ | CO | $CO_2$ | |
| 50 | 4 | 70.5% | 22.7% | 6.8% | 98.8% | 0 | 1.2% | 30.9% |
| 50 | 6 | 71.7% | 21.5% | 6.8% | 98.6% | 0 | 1.4% | 45.7% |
| 100 | 4 | 70.7% | 22.3% | 7.0% | 98.0% | 0 | 2.0% | 53.0% |
| 100 | 8 | 73.0% | 19.5% | 7.5% | 95.5% | 0 | 4.5% | 91.2% |
| 150 | 4 | 73.0% | 19.4% | 7.6% | 95.9% | 0 | 4.1% | 87.1% |

TABLE 3

| Membrane temperature °C. | Non-permeation pressure kg/cm² | Time lapsed Hour | Inlet gas (mol %) | | | Composition of permeated gas (mol %) | | | Permeated gas/non-permeated gas (Molar ratio) |
|---|---|---|---|---|---|---|---|---|---|
| | | | $H_2$ | CO | $CO_2$ | $H_2$ | CO | $CO_2$ | |
| 50 | 6 | 1 | 71.4% | 21.8% | 6.8% | 98.6% | 0 | 1.4% | 0.479 |
| 50 | 6 | 3 | 71.1% | 22.1% | 6.8% | 98.6% | 0 | 1.4% | 0.478 |
| 50 | 6 | 5 | 71.5% | 21.7% | 6.8% | 98.6% | 0 | 1.4% | 0.499 |

Figure 3B:
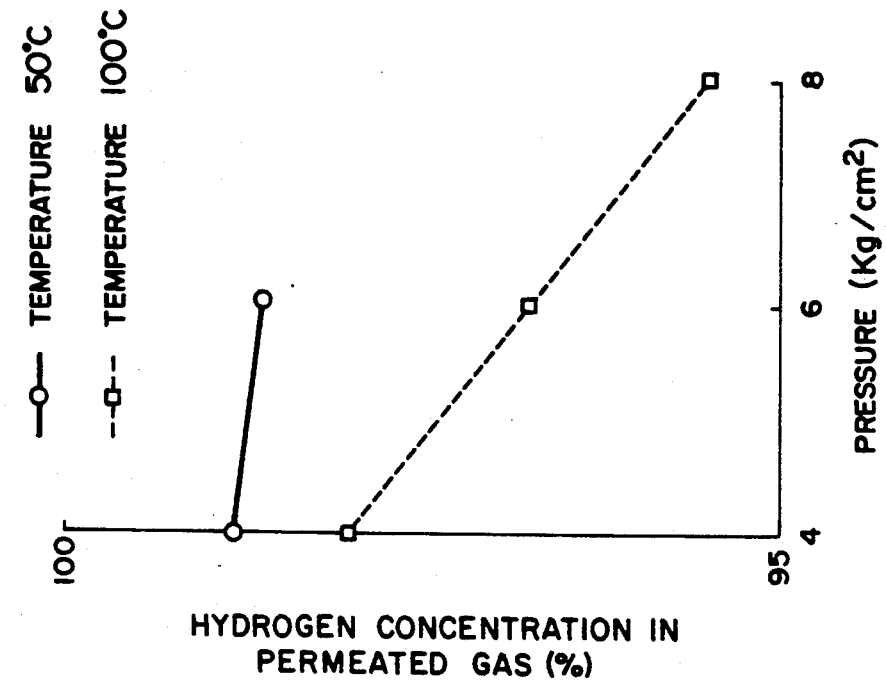
FIGS. 3A and 3B are graphs which show relation between membrane separation performance and pressure.
Figure 3A:
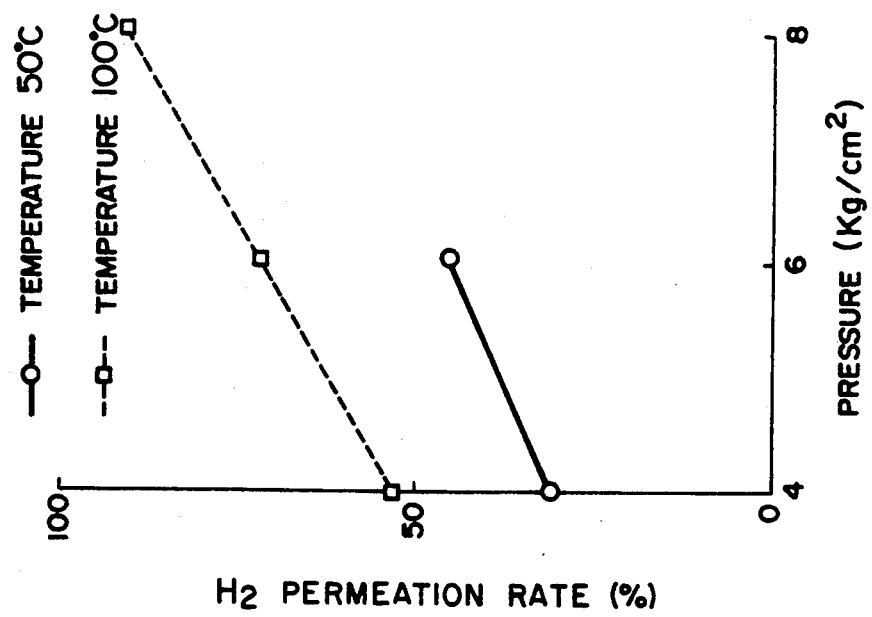

Relation between hydrogen gas permeation rate and pressure and relation between hydrogen concentration in permeated gas and pressure are shown in FIGS. 3A and 3B respectively, and relation between hydrogen gas permeation rate and temperature and relation between hydrogen concentration in permeated gas and temperature are shown in FIGS. 4A and 4B respectively.

Operating temperature for membrane separation is determined by maximum working temperature (150° C.) and operating pressure is determined by maximum pressure of reformer (10 kg/cm²) in the preceding step. Under the experimental conditions, substantially no permeation of CO was recognized. It has been seen that under constant pressure of separation membrane, recovery of hydrogen increases with increase of temperature, and under constant temperature of separation membrane, recovery of hydrogen increases with increase of pressure.

From the above experimental results, operating conditions of separation membrane were suitably temperature 50°–150° C. and pressure 2–10 kg/cm².

It has been seen that when hydrogen recovery is set at 90 vol % or higher in view of thermal efficiency of the whole process and concentration of recovered hydrogen is set at 95% or higher in view of hydrogen partial pressure at hydro desulfurization, recovery of 91.2% and hydrogen concentration of 95.5% are obtained under the conditions of, for example, temperature 100° C. and pressure 8 kg/cm² and thus the aims can be sufficiently achieved.

Figure 5:
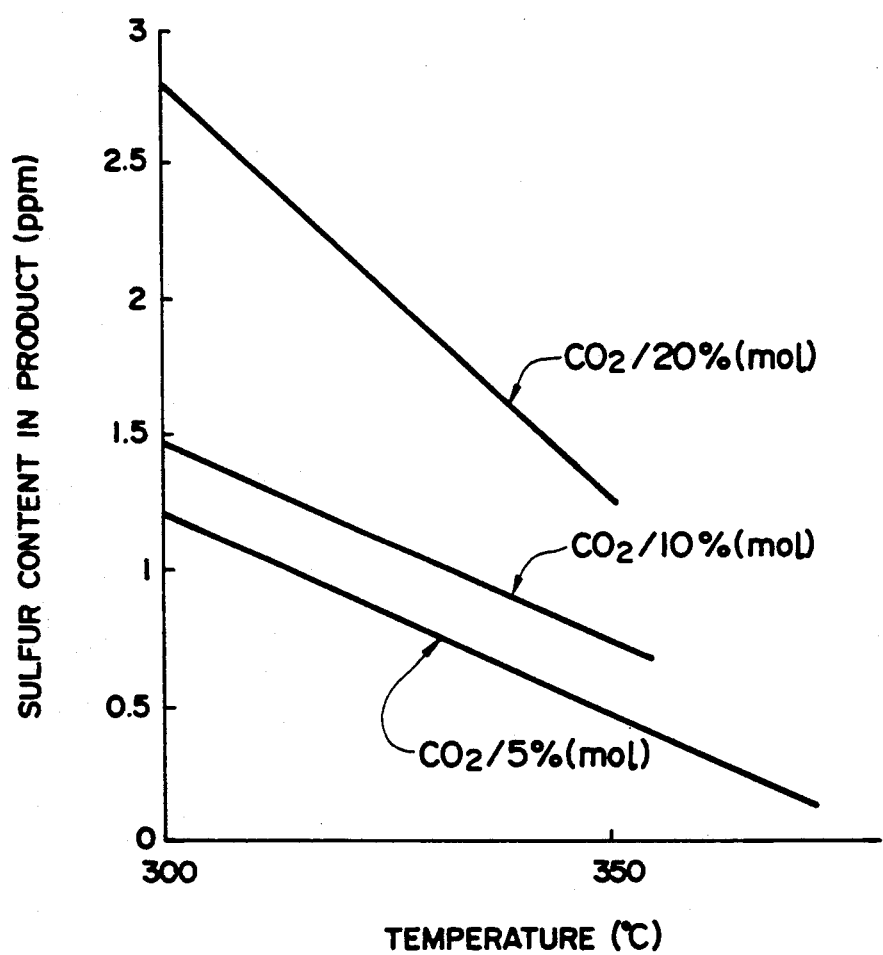
FIG. 5 is a graph which shows relation between temperature of desulfurizer and sulfur content in the product when a gas containing carbon dioxide which permeated through separation membrane was used as hydrogen gas for desulfurization.

Furthermore, since gas which has permeated through separation membrane is a mixed gas mainly composed of hydrogen which contains 10 mol % or less of carbon dioxide, the reformed gas can be desulfurized to 1 ppm or less of sulfur content by using a part of the permeated gas as hydrogen gas for desulfurization shown in FIG. 5.

According to the present invention, by replacing shift converter in fuel cell electricity generation process by membrane separation method, catalyst used in shift converter is not needed, thus control of temperature and pressure in shift converter and replacement of catalyst are also not required. Furthermore, in view of the facts that two kinds of catalysts for high temperature and low temperature are used in conventional converter and two reactors are required and moreover, reduction step is necessary for pretreatment of catalyst, merit of using membrane separation method is great.

Further, according to membrane separation method, hydrogen of high purity can be obtained only by control of pressure, and thus operation is simple.

Since the gas which has permeated through membrane is mainly composed of hydrogen and contains 10 mol% or less of carbon dioxide, a part of the gas can be used as hydrogen gas for desulfurization and desulfurization rate can be improved.

Further, gas which has not permeated through membrane can be utilized as fuel for reformer-furnace.

We claim:

1. An improved fuel cell electricity generation process comprising:
   providing an apparatus which includes a desulfurizer, an adsorber, a reformer, a non-porous gas separation membrane comprising a polymer, and a fuel cell;
   using said separation membrane to treat reformed gas from the reformer at a temperature of 50°–150° C. and under a pressure of 2–10 kg/cm² to separate carbon monoxide contained in the reformed gas; and
   feeding gas which permeats through the separation membrane to said fuel cell.

2. A process according to claim 1, wherein methanol, natural gas, kerosene, naphtha or LPG is used as a fuel for the fuel cell electricity generation process.

3. A process according to claim 1, wherein a raw material fuel is desulfurized in the desulfurizer using a desulfurizing catalyst at 400° C. or lower, a pressure of 10 kg/cm² or lower to reduce sulfur content to 1 ppm or lower.

4. A process according to claim 1, wherein in the adsorber the gas from the desulfurizer is treated at a temperature of 400° C. or lower and a pressure of 10 kg/cm² or lower.

5. A process according to claim 1, wherein the raw material which is fed to the reformer has a specific gravity of 0.4–0.85 and comprises $C_1$–$C_{20}$ hydrocarbons.

6. A process according to claim 1, wherein conditions in the reformer are a temperature of 700°–850° C., a pressure of at most 10 kg/cm², a molar ratio $H_2O/C$ of at least 2, and an SV of 0.5–4.0 hr$^{-1}$.

7. A process according to claim 6, wherein gas produced in the reformer comprises 65–80 vol % of $H_2$, 5–20 vol % of CO, and 5–25 vol % of $CO_2$.

8. A process according to claim 1, wherein the gas separation membrane comprises a polyimide.

* * * * *